United States Patent
Bobier

(10) Patent No.: US 7,944,892 B2
(45) Date of Patent: May 17, 2011

(54) TIME COORDINATED BASE STATION AND ANTENNA ARRAY FOR INTEGER CYCLE AND IMPULSE MODULATION SYSTEMS

(75) Inventor: Joseph A. Bobier, Sunrise, FL (US)

(73) Assignee: XG Technology, Inc., Sarasota, FL (US)

( * ) Notice: Subject to any disclaimer, the term of this patent is extended or adjusted under 35 U.S.C. 154(b) by 860 days.

(21) Appl. No.: 11/983,184

(22) Filed: Nov. 7, 2007

(65) Prior Publication Data
US 2008/0117883 A1   May 22, 2008

Related U.S. Application Data

(60) Provisional application No. 60/859,620, filed on Nov. 17, 2006.

(51) Int. Cl.
H04B 7/216 (2006.01)
(52) U.S. Cl. .............................................. 370/335
(58) Field of Classification Search .................. 370/335
See application file for complete search history.

(56) References Cited

U.S. PATENT DOCUMENTS

| | | | |
|---|---|---|---|
| 4,107,692 A | | 8/1978 | Hutcheon et al. |
| 5,533,027 A | * | 7/1996 | Akerberg et al. ............ 370/347 |
| 6,201,801 B1 | | 3/2001 | Dent |
| 6,259,685 B1 | * | 7/2001 | Rinne et al. ................. 370/330 |
| 6,411,612 B1 | * | 6/2002 | Halford et al. ............... 370/347 |
| 6,766,146 B1 | * | 7/2004 | Park et al. ..................... 455/69 |
| 7,126,553 B1 | | 10/2006 | Fink et al. |
| 7,260,079 B1 | * | 8/2007 | Chapman et al. ............ 370/338 |
| 7,583,630 B2 | * | 9/2009 | Rajkotia et al. .............. 370/329 |
| 7,873,326 B2 | * | 1/2011 | Sadr ........................... 455/67.16 |
| 2001/0016504 A1 | * | 8/2001 | Dam et al. ................... 455/562 |
| 2002/0155818 A1 | * | 10/2002 | Boros et al. ................ 455/67.4 |
| 2004/0038713 A1 | * | 2/2004 | Okawa et al. ................ 455/561 |
| 2004/0121782 A1 | * | 6/2004 | Tester ........................ 455/456.1 |
| 2005/0002440 A1 | | 1/2005 | Alamouti et al. |
| 2005/0075125 A1 | * | 4/2005 | Bada et al. .................... 455/525 |
| 2005/0249178 A1 | * | 11/2005 | Bolgiano et al. ............. 370/342 |

* cited by examiner

Primary Examiner — Jeffrey Pwu
Assistant Examiner — Saad A. Waqas
(74) Attorney, Agent, or Firm — Dennis L. Cook, Esq.

(57) ABSTRACT

An improved antenna and coordination arrangement for use at a base station that will eliminate over the air collisions while doubling the effective data rate of each base station in a network is disclosed. The result will be large area networks which all share exactly the same radio spectrum without mutual interference and little effort required to expand a single base station system to a grid of cooperative base stations forming a coverage area of ubiquitous coverage and multiplied data capacity. Specifically, this disclosure describes an improved antenna arrangement and synchronization system for use when multiple radio base stations, each using a deterministic over the air MAC layer, are located within overlapping coverage areas.

3 Claims, 4 Drawing Sheets

Figure 4
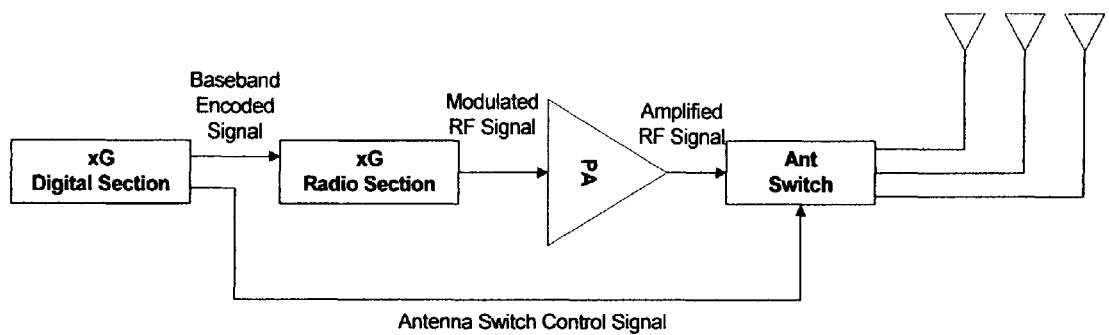
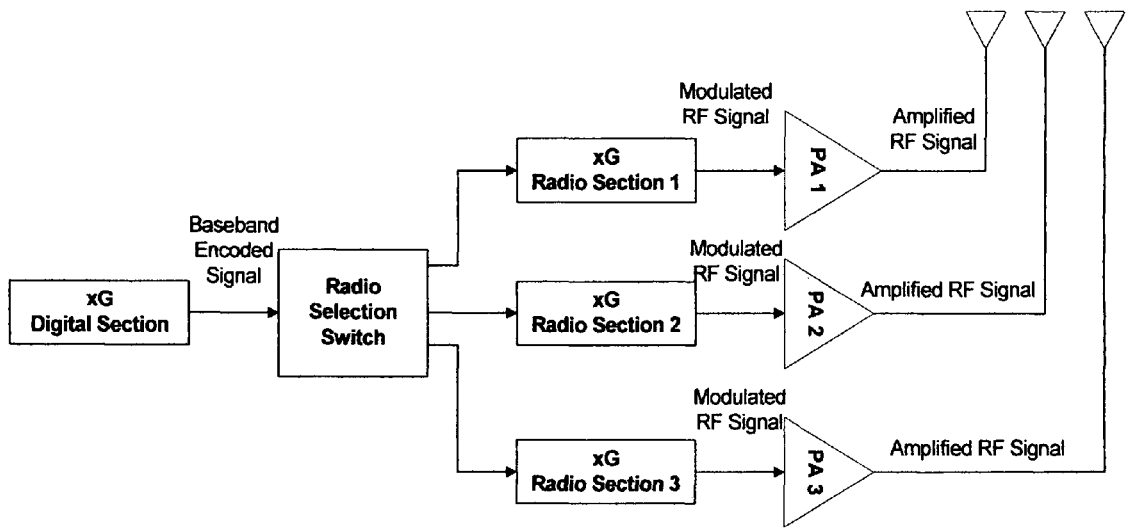
Figure 5

TIME COORDINATED BASE STATION AND ANTENNA ARRAY FOR INTEGER CYCLE AND IMPULSE MODULATION SYSTEMS

CROSS-REFERENCE TO RELATED APPLICATION

The present application claims the benefit of previously filed Provisional Patent Application Ser. No. 60/859,620.

FIELD OF THE INVENTION

This invention addresses the need to transport high bit-rate data over wireless means using specially modulated radio frequency carrier waves. Specifically, this disclosure describes an improved time coordinated base station and antenna arrangement for use when multiple radio base stations, using a deterministic over the air medium access control (MAC) layer, are located within overlapping coverage areas.

BACKGROUND OF THE INVENTION

Radio transmission of information traditionally involves employing electromagnetic waves or radio waves as a carrier. Where the carrier is transmitted as a sequence of fully duplicated wave cycles or wavelets, no information is considered to be transmissible. To convey information, historically, the carrier has superimposed on it a sequence of changes that can be detected at a receiving point or station. The changes imposed correspond with the information to be transmitted, and are known in the art as "modulation".

Where the amplitude of the carrier is changed in accordance with information to be conveyed, the carrier is said to be amplitude modulated (AM). Similarly, where the frequency of the carrier is changed in accordance with information to be conveyed, either rarified or compressed wave cycles are developed, and the carrier is said to be frequency modulated (FM), or in some applications, it is considered to be phase modulated. Where the carrier is altered by interruption corresponding with information, it is said to be pulse modulated.

Currently, essentially all forms of the radio transmission of information are carried out with amplitude modulation, frequency modulation, pulse modulation or combinations of one or more. All such forms of modulation have inherent inefficiencies. For instance, a one KHz audio AM modulation of a Radio Frequency (RF) carrier operating at one MHz will have a carrier utilization ratio of only 1:1000. A similar carrier utilization occurs with corresponding FM modulation. Also, for all forms of currently employed carrier modulation, frequencies higher and lower than the frequency of the RF carrier are produced. Since they are distributed over a finite portion of the spectrum on each side of the carrier frequency, they are called side frequencies and are referred to collectively as sidebands. These sidebands contain all the message information and it has been considered that without them, no message can be transmitted. Sidebands, in effect, represent a distribution of power or energy from the carrier and their necessary development has lead to the allocation of frequencies in terms of bandwidths by governmental entities in allocating user permits within the radio spectrum. This necessarily limits the number of potential users for a given RF range of the spectrum.

To solve the bandwidth crisis in the RF Spectrum, multiple access systems were developed. Multiple Access Systems are useful when more than one user tries to transmit information over the same medium. The use of multiple access systems is more pronounced in Cellular telephony; however, they are also used in data transmission and TV transmission. There are three common multiple access systems. They are:
 1. Frequency Division Multiple Access (FDMA)
 2. Time Division Multiple Access (TDMA)
 3. Code Division Multiple Access (CDMA)

FDMA is used for standard analog cellular systems. Each user is assigned a discrete slice of the RF spectrum. FDMA permits only one user per channel since it allows the user to use the channel 100% of the time. FDMA is used in the current Analog Mobile Phone System (AMPS).

In a TDMA system the users are still assigned a discrete slice of RF spectrum, but multiple users now share that RF carrier on a time slot basis. A user is assigned a particular time slot in a carrier and can only send or receive information at those times. This is true whether or not the other time slots are being used. Information flow is not continuous for any user, but rather is sent and received in "bursts". The bursts are re-assembled to provide continuous information. Because the process is fast, TDMA is used in IS-54 Digital Cellular Standard and in Global Satellite Mobile Communication (GSM) in Europe. In large systems, the assignments to the time/frequency slots cannot be unique. Slots must be reused to cover large service areas.

CDMA is the basis of the IS-95 digital cellular standard. CDMA does not break up the signal into time or frequency slots. Each user in CDMA is assigned a Pseudo-Noise (PN) code to modulate transmitted data. The PN code is a long random string of ones and zeros. Because the codes are nearly random there is very little correlation between different codes. The distinct codes can be transmitted over the same time and same frequencies, and signals can be decoded at the receiver by correlating the received signal with each PN code.

The great attraction of CDMA technology from the beginning has been the promise of extraordinary capacity increases over narrowband multiple access wireless technology. The problem with CDMA is that the power that the mobiles are required to transmit goes to infinity as the capacity peak is reached. i.e. the mobiles will be asked to transmit more than their capacity allows. The practical consequence of this is that the system load should really be controlled so that the planned service area never experiences coverage failure because of this phenomenon. Thus CDMA is a tradeoff between maximum capacity and maximum coverage.

When a radio base station communicates with multiple end user devices using a radio channel which is fully occupied by the signal from the base station, and a second base station must be added to the same geographical area to enhance system capacity or signal propagation, a means of sharing of the radio channel is required so as to eliminate mutual interference from one base station to the next. Even further, more than two base stations might be necessary to fill the coverage and bandwidth requirements of the service area. Traditionally systems which are contention based, such as WiFi or 802.11 must compete for air time. This invariably results in competition for time and collisions of signals from one base station to the next. Thus collisions result in data errors and reduced overall bandwidth. Deterministic systems such as the TDMA method assign specific time slots or durations of time during which base stations and end user devices may communicate. This creates an opportunity to synchronize transmission times from one base station to another, allowing efficient and interference free communications.

In essence, it is an object of this invention to disclose an improved time coordinated base station and antenna arrangement for use when multiple radio base stations using integer cycle or impulse type modulation using a deterministic over the air MAC layer are located within overlapping coverage areas.

BRIEF SUMMARY OF THE INVENTION

The invention disclosed in this application uses any integer cycle or impulse type modulation and more particularly is designed to work with a method of modulation named Tri-State Integer Cycle Modulation (TICM) which has been previously disclosed in U.S. Pat. No. 7,003,047 issued Feb. 21, 2006 filed by the inventor of this disclosure.

The method described here discloses an improved time coordinated base station and antenna and arrangement which will eliminate over the air collisions. The result will be large area networks which all share exactly the same radio spectrum without mutual interference and little effort required to expand a single base station system to a grid of cooperative base stations forming a coverage area of ubiquitous coverage.

For a filler understanding of the nature and objects of the invention, reference should be made to the following detailed description taken in connection with the accompanying drawings.

DESCRIPTION OF THE DRAWINGS

For a fuller understanding of the nature and objects of the invention, reference should be made to the accompanying drawings, in which:

FIG. 4 is a block schematic diagram of a three sector antenna time coordinated base station circuitry.

FIG. 5 is a block schematic diagram of an alternative three sector antenna time coordinated base station circuitry.

DETAILED DESCRIPTION OF THE INVENTION

The invention disclosed in this application can use any integer cycle, ultra-wide band or impulse type modulation and more particularly is shown in the preferred embodiment to work with a method of modulation named Tri-State Integer Cycle Modulation (TICM) which has been described above but it could be used with any modulation system.

Figure 1:
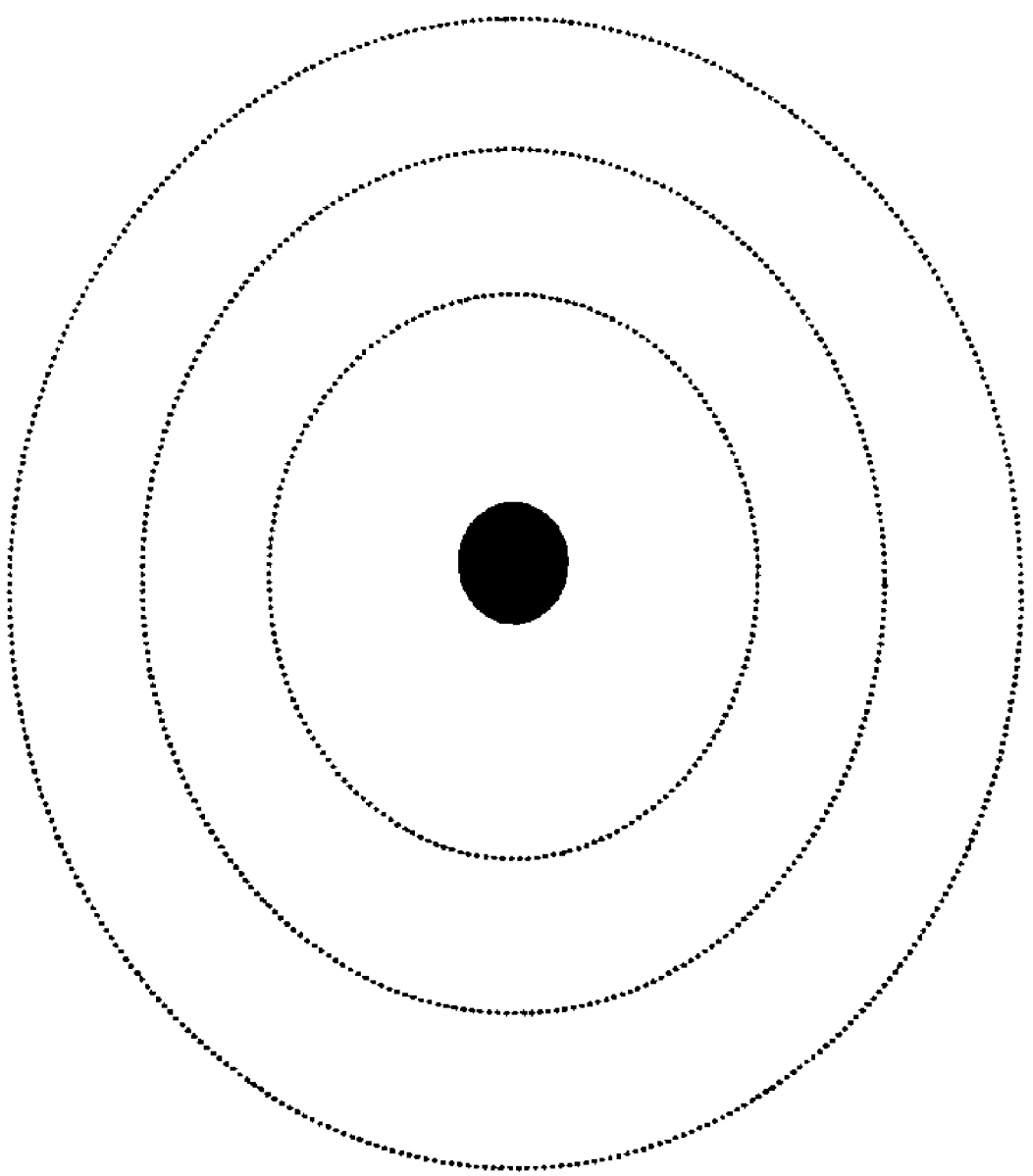
FIG. 1 is a representation of an omni-directional antenna base station.

Consider a base station which is equipped with a single omni-directional antenna as shown in FIG. 1. If such a base station is using a TDMA system wherein each end user is assigned, occupying, and using its time slot, and all time slots are fully assigned, the radio spectrum will be considered to be fully utilized because communication between the base station and any given end user device will always be active. The channel is full. Placing another base station in the same geographic coverage area will be detrimental to both base stations because the radio signals will overlap and communications will be subject to mutual interference. Thus base stations with overlapping coverage areas on the same radio frequencies will be problematic. Traditional cellular systems use FDMA or multiple radio frequencies to segregate coverage areas to avoid interference. Systems that have limited radio bandwidth may not have the luxury of multiple radio frequencies to accommodate traditional FDMA architectures.

Figure 2:
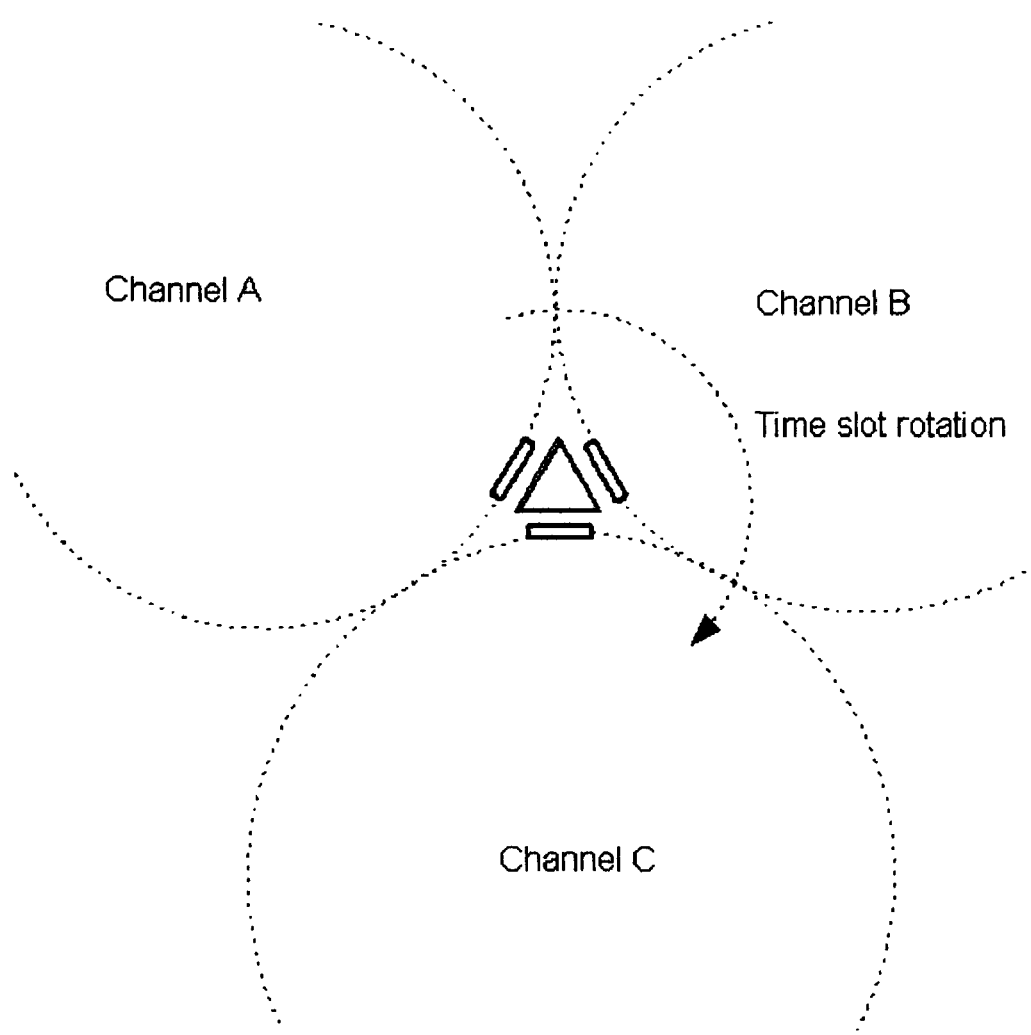
FIG. 2 is a representation of a three sector antenna time coordinated base station.

In the preferred embodiment of this invention we replace the omni directional antenna with three antennas, each with a radiation pattern of 120 degrees as shown in FIG. 2. Now we have antennas A, B, and C. To place multiple base stations in the same overlapping geographic environment the signal must be channelized and/or sectorized. The following method has the advantage that full base station capacity is maintained at each tower even though multiple base stations will co-exist with overlapping coverage.

To implement the preferred embodiment first program the base station, which is equipped with three antenna jacks or outlets, each corresponding to one of the three antennas, to form three independent radio data streams or signals. That is to say that each antenna jack will transmit an independent radio stream to the group of end user devices that are located within its coverage area. A schematic representation of two types of circuitry to accomplish this is shown in FIGS. 4 and 5 where FIG. 4 shows a method using only one antenna switch and one RF section and FIG. 5 uses one control switch and three RF sections. Thus, using circuitry as shown in the figures the radio channel can be divided into three sub-channels defined by the geographic orientation of the antenna.

Each base station will actually have three RF outputs with three sets of RF amplifiers. Each output is selectable by the base station. Likewise each RF output will have an accompanying RF input. The three RF I/O's are individually enabled by the base station independently. A directional antenna with a 120 degree pattern is connected to each RF I/O and together the antennas are pointed away from the tower in a 360 degree pattern. These antennas should have a front to back ratio of 40 db or better.

However, even with this three antenna arrangement, further complications will arise when additional base stations are added to the coverage area, essentially reverting back to the original problem mentioned above of a fully utilized channel with no time for additional time slots. Therefore a further enhancement is added which will allow the sharing of air time between base stations as described below.

The available timeslots in the MAC layer are divided into three groups. Each group is assigned to one RF I/O. Thus, the super frame structure will need to be modified into three smaller super frames. The RF I/O's and the associated group of timeslots are called a channel. From the perspective of a single base station, the super frame is serviced in a sequential fashion. In reality a circular fashion. Consider then the three new smaller super frames, connected end to end to form a circle. As the MAC rotates through the frames, the associated channel becomes active and the appropriate sector, served by its 120 degree antenna is served. This means then that the sector for each channel, A, B or C is quiet for ⅔rds of the time.

Another tower, some distance away can have an identical setup. The sector that points toward the first tower will have a different channel designation than the sector pointing towards the second tower. Thus, if the two towers are coordinated in timebase, the two overlapping lobes from tower one and tower two will never be "ON" at the same time.

Thus, full capacity is maintained for each tower, provision is made for co-existence of any number of towers and contiguous strong signal strength can blanket even large cities. Since the antenna arrangement for each base station is using an antenna beam width of 120 degrees, additional base stations can be located in a grid pattern with antennas arranged in a triangular or geodesic like pattern. This allows for very close location of multiple base stations, with even very strong signal densities to the end users, giving strong coverage and a high quality of service with no mutual interference, and all using exactly the same radio frequencies.

Figure 3:
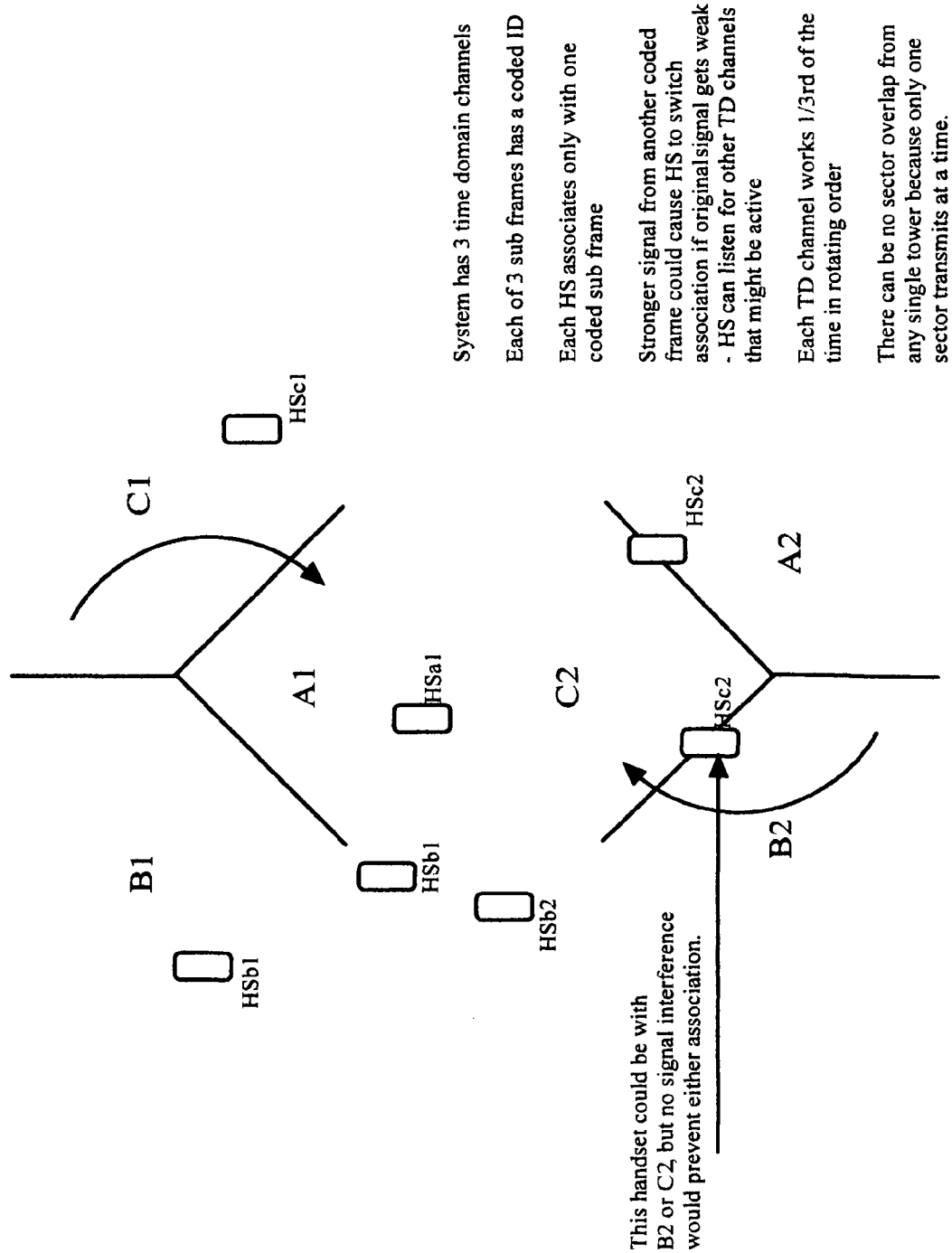
FIG. 3 is a representation of a grid of three sector antenna time coordinated base stations.

FIG. 3 shows the preferred embodiment in a grid configuration with handsets to illustrate this invention. As mentioned above the system has three time domain channels and each of the three sub frames has a coded ID. Each handset associates only with one coded sub frame. A stronger signal from another coded frame could cause the handset to switch association if the original signal gets weak, i.e., the handset can listen for other time domain channels that might be active. Each time domain channel works $\frac{1}{3}^{rd}$ of the time in rotating order. Thus, there can be no sector overlap from any single tower because only one sector transmits at a time.

Since certain changes may be made in the above described RF signal modulation and reception method without departing from the scope of the invention herein involved, it is intended that all matter contained in the description thereof or shown in the accompanying figures shall be interpreted as illustrative and not in a limiting sense.

What is claimed is:

1. A time coordinated base station and antenna array system for radio frequency transmission and reception with mobile devices comprising;

an antenna array having three antennas with each of said antennas having a radiation pattern of 120 degrees and horizontally aligned in a circular pattern such that said antenna array is capable of transmitting in a full 360 degree pattern;

a base station having three antenna outlets with one of each of said antenna outlets electrically connected to one of each of said antennas such that each of said antenna outlets is capable of receiving and transmitting independent radio frequency signals with mobile devices within each of said antennas' radiation patterns;

said base station having a medium access control system with a superframe structure to control timeslots of radio frequency receptions and transmissions;

said superframe structure being divided into three timeslot group subframes with one of each of said timeslot group subframes being assigned to one of each of said antenna outlets resulting in three channels of radio frequency receptions and transmissions such that when one said superframe structure is activated said channels are activated in a sequential manner employing said three antennas, one at a time, effectively rotating the radiation pattern about a 360 degree arc in three steps wherein the airtime for each of said channels is then available only $\frac{1}{3}$ of the time in any channel; and, additional antenna arrays having similar antenna and base station configurations to said antenna array wherein said additional antenna arrays are placed in a triangular or geodesic pattern in relation to said antenna array and such that none of said channels of said antenna array or any of said additional antenna arrays are activated while a directly opposing channel of said antenna array or any of said additional antenna arrays is activated.

2. The time coordinated base station and antenna array system of claim 1 wherein each of said antennas has a front to back radio frequency signal ratio of at least 40 db.

3. The time coordinated base station and antenna array system of claim 1 wherein each of said timeslot group subframes has a coded identification and each mobile device communicates with only one coded timeslot group subframe.

* * * * *